United States Patent [19]

McFiggans

[11] 3,731,293

[45] May 1, 1973

[54] AUTOMATIC PHASE SWITCHING OF PHASE-CODED RECORDINGS

[75] Inventor: Robert B. McFiggans, Stamford, Conn.

[73] Assignee: Pitney-Bowes, Inc., Stamford, Conn.

[22] Filed: Apr. 5, 1972

[21] Appl. No.: 241,266

[52] U.S. Cl. ....................340/174.1 H, 340/174.1 B

[51] Int. Cl. ....................G11b 5/02, G11b 5/44

[58] Field of Search ....................340/174.1 B

[56] References Cited

UNITED STATES PATENTS

| | | | |
|---|---|---|---|
| 3,039,084 | 6/1962 | Curris | 340/174.1 H |
| 3,016,522 | 1/1962 | Loorie et al. | 340/174.1 H |
| 3,597,751 | 8/1971 | Heidecker et al. | 340/174.1 H |
| 3,581,297 | 5/1971 | Behr | 340/174.1 H |

*Primary Examiner*—Vincent P. Canney
*Attorney*—William D. Soltow, Jr. et al.

[57] ABSTRACT

Apparatus reads phase-coded flux representing data from a magnetic tape and at the end of a block of data determines whether the representation of the magnetic flux transition at the end of the block is in a particular direction and if not the read out signals are inverted while the tape is reread.

8 Claims, 1 Drawing Figure

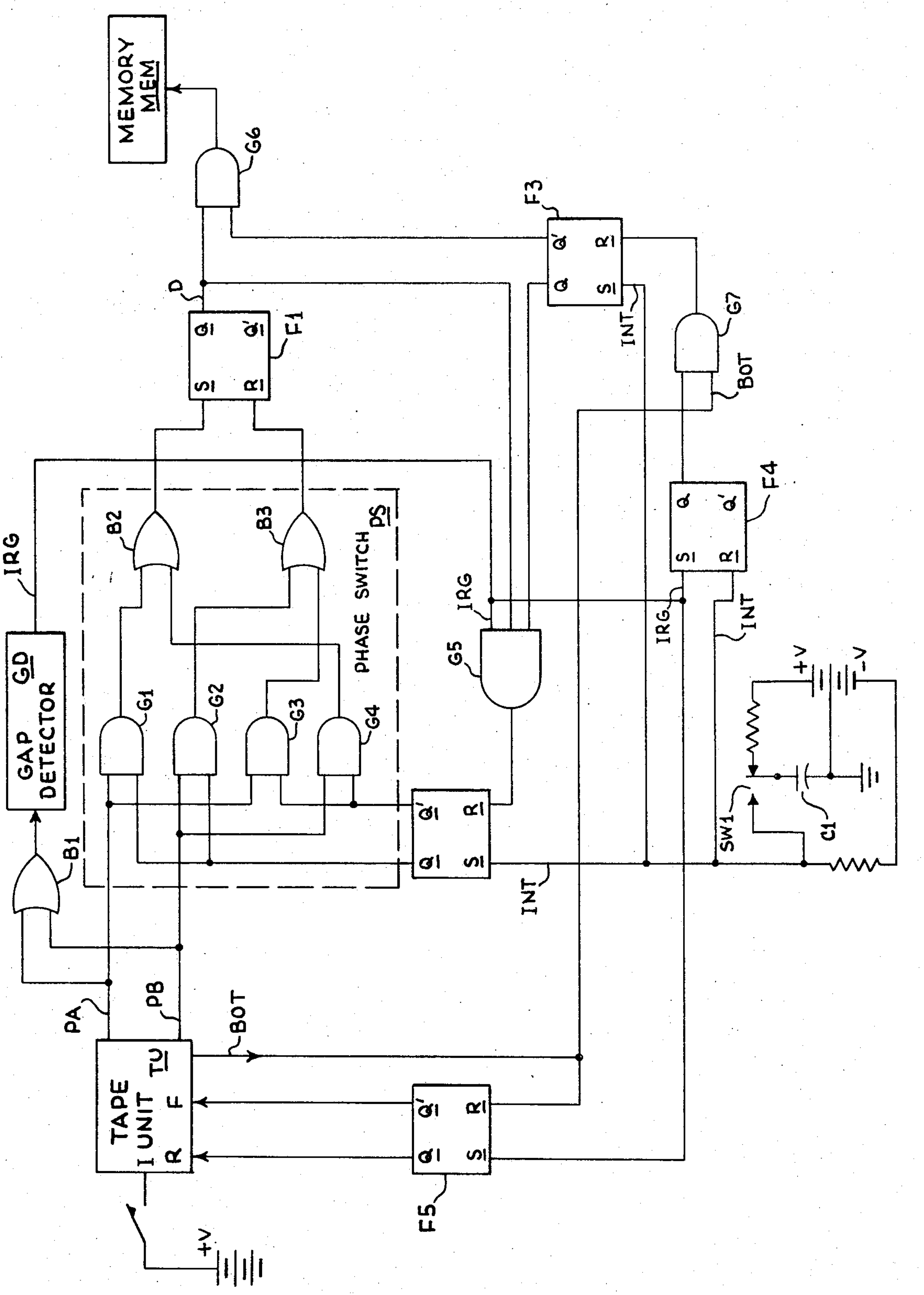
MEMORY MEM
G6
F3
D
F1
G7
BOT
F4
IRG
GAP DETECTOR GD
B2
B3
PHASE SWITCH PS
G5
G1
G2
G3
G4
SW1
C1
+V
-V
B1
INT
PA
PB
TAPE UNIT TU
F5
+V

AUTOMATIC PHASE SWITCHING OF PHASE-CODED RECORDINGS

BACKGROUND OF THE INVENTION

This invention pertains to the reading of phase-coded recordings and more particularly to apparatus for insuring the reliable phase interpretations of magnetic recordings.

In order to achieve high bit rates or packing densities on magnetic tapes it has been found desirable to use phase-coded recordings wherein the two possible binary values of a bit are represented by the two possible transition directions of flux change, i.e., a positive going change or a negative going change.

When reading the data there are essentially two ways to translate the recorded flux patterns into logic levels representing the binary values. One way is to use every flux transition that occurs, regardless of direction, to toggle a J-K flip-flop. With this technique it is not important that the initial recording is inverted or not. However, this technique has the disadvantage in that if a bit is transiently dropped or added in the data stream, all succeeding bits are incorrect. The other way of translating the flux pattern is to discriminate between flux transitions in different directions and use these to set and reset a simple set-reset flip-flop. In particular, all positive going transitions are shaped into pulses which are fed to the set input of the flip-flop while all negative going transitions are shaped into pulses which are fed to the reset input of the flip-flop. This technique is more reliable than the other technique because a dropped bit will not invalidate the succeeding data. However, this technique requires that all tapes to be read conform to a standard phasing of the recording and in particular, that the recording has a standard polarity, i.e., for example, that the north seeking poles of the recording be at the correct end of a leader and the interrecord gaps. Unfortunately, mispolarization can easily arise by carelessness in wiring the recording heads or by completely disregarding proposed industry standards.

In information acquisition systems it is possible that different magnetic tape cassette recorders initially capture the data. Thereafter, the cassettes are sent to a central processor and reader for batch processing. Because of the diverse sources of the tapes it has been found that a certain percentage of the recordings are improperly phased.

If one knows beforehand which phasing was used in the initial recording it would by a simple matter to selectively control the phasing of the read signals so that they appear to the flip-flop as being correctly phased. However, this knowledge is difficult to obtain and is usually found out when errors arise in subsequent data processing.

It is, accordingly, a general object of the invention to provide apparatus which automatically presents properly phased signals to the translating circuitry of the reader of a phase-coded magnetic tape system.

DESCRIPTION OF THE INVENTION

There is provided, in combination with a magnetic tape unit which generates different phased signals while reading phase-coded magnetic recordings of blocks of data from a magnetic tape wherein the blocks are terminated by unique regions on the tape demarcated by an assumed particular direction of flux transition, apparatus for insuring that the data transferred to a data utilization device correctly represents the data recorded on the magnetic tape. The apparatus comprises means for controlling the magnetic tape unit to drive the magnetic tape in a first direction and read the magnetic tape, means for generating data signals related to the phase of the signals generated by the tape unit reading the tape, means for determining the phase of a signal representing the actual direction of flux transition at the demaracation of a unique region being read, and means for inverting the phase of all signals received by the means for generating data signals when the phase of the signal representing the actual direction of flux transition is different from the phase of a signal representing the assumed particular direction of flux transition.

Other objects, features and advantages of the invention will be apparent from the following detailed description when read with the accompanying drawing whose sole FIGURE shows, by way of example, and not limitation, a block diagram of apparatus for realizing the invention.

In the sole FIGURE a processor for processing data recorded on magnetic tape comprises a tape unit TU, a phase switch PS, a data signal generator in the form of set-reset flip-flop F1 and a memory MEM serially connected in that order so that data recorded on tape unit TU can be stored in memory MEM for further processing. The remainder of the processor is primarily concerned with sequencing and control circuitry to insure that data signals generated by flip-flop F1 truly represent the data recorded on the magnetic tape of tape unit TU.

In general, the tape unit Tu starts reading from the beginning of the magnetic tape the flux recorded thereon and transmits two parallel streams of pulses on lines PA and PB, via phase switch PS preset in given state, to the set terminal S and reset terminal R of flip-flop F1. The pulses on line PA can represent positive going changes and the pulses on line PB can represent negative going changes of the phase-coded flux pattern recorded on the magnetic tape. Flip-flop F1 changes state in response to these signals and generates a signal (logic levels) on line D representing data bits. At this time, as will hereinafter become apparent, AND-circuit G6 is blocked so the data bits do not enter memory MEM. When the end of a block of data is reached, the equivalent of the phase (logic level) of the signal on line D is sensed, i.e., is the signal high or low. If the signal is low then the initial recording on the magnetic tape was properly phased and the state of phase switch PS is not changed. However, if the signal is high indicating that the initial recording was inverted usually because of a reverse wiring of the recording head used in the initial recording vis-a-vis the wiring of the reading head of tape unit TU, the state of phase switch PS is reversed. In such case, line PA is connected to input terminal R, and line PB to input terminal S of flip-flop F1.

In either case, tape unit TU then drives the magnetic tape in the reverse direction. When the beginning of the tape is sensed, the drive is again reversed to the forward direction and AND-gate G6 is opened. During this second forward pass of the magnetic tape the data is again read and the properly phased data bits pass through ANDigate G6 to memory MEM.

Before proceeding with a detailed description of the operation, the several elements of the system will be described.

Tape unit TU can take many forms. A specific example in which the phasing problem most often arises is with a tape unit for reading magnetic tape cassettes. The tape unit, as a minimum, should include a means for generating a beginning of tape signal on line BOT, a cassette drive means for moving the tape controllably forward in response to a signal at input terminal F, controllably backward in response to a signal on input terminal R, means for activating the drive and electronics in response to a signal on input terminal I, a reading or reproducing head for reading the flux changes as the magnetic tape moves past, and electronics for amplifying the signals from the read head, shaping the positive going pulses therefrom into sharply defined positive pulses on line PA and shaping the negative going pulses therefrom into sharply defined positive pulses on line PB. The memory MEM can be a buffer for connection to an input register of a minicomputer which is used to process the data. The gap detector GD which indicates the end of a block of data recorded on the magnetic tape can be a retriggerable single-shot circuit whose output goes low when first triggered and remains low as long as it receives triggers which are spaced no more than say several bit times apart. The remainder of the circuitry comprises set-reset type flip-flops, AND-circuits, and OR-circuits operating with positive logic. There are two switches SW1 and SW2. Although these switches are shown as mechanical devices, it should be realized that when the apparatus is being used with a minicomputer the signals generated by the switches would be generated by the minicomputer.

In operation, switch SW1 is moved from its connection to voltage source +V to line INT causing the discharge of capacitor C1 and the transmission of a voltage pulse to the set flip-flops F2 and F3 and to the reset terminal R of flip-flop F4. When flip-flop F2 sets its Q output opens AND-circuits G1 and G2 while its Q' output blocks AND-circuit G3 and G4. Accordingly, phase switch PS is set to a first state wherein line PA is connected to the set terminal S and line PB is connected to the reset terminal R of flip-flop F1. Thus, the outputs of tape unit TU are fed "uninverted" to flip-flop F1. The initial assumption is that there is no inversion in the recording on the magnetic tape and that the tape is at its beginning leader. The reset of flop-flop F4 blocks AND-circuit G7.

The switch SW2 is closed energizing tape unit TU which emits a beginning-of-tape signal on line BOT connected to reset terminal R of flip-flop F5. The reset of flip-flop F5 causes the transmission of a signal from the Q' output thereof to the terminal F of tape unit TU which starts driving the magnetic tape forward past the reproducing head. Flip-flop F3, having been set by the initialize pulse on line INT, blocks AND-circuit G6 while the signal on its Q output alerts AND-circuit G5 to sense for the state of the line D at the end of a block of data. The pulses on line PA pass via AND-circuit G1 and OR-circuit B2 to terminal S while the pulses on line PB pass via AND-circuit G2 and OR-circuit B3 to terminal R to cause flip-flop F1 to generate on line D logic level representations of the data bits. This continues until the end of a block is detected by gap detector GD failing to receive a trigger for the given period of time. Gap detector GD transmits a high signal on line IRG which is connected to an input of AND-circuit G5 and to the set terminal S of flip-flop F4. Flip-flop F4 sets and the signal on its Q output opens AND-circuit G7. More importantly, the signal on line IRG is used by AND-circuit G5 to determine whether the direction of the flux change at the end of block region of the magnetic tape has a predetermined polarity. If the recording were inverted, then the signal on line D connected to the third input of AND-circuit G5 would be high causing a signal to pass through AND-circuit G5 to the reset terminal R of flip-flop F2. The flip-flop F2 is reset with the signal on its Q output blocking AND-circuits G1 and G2 and the signal on its Q' output opening AND-circuits G3 and G4. In effect, phase switch PS switches states with line PA connected, via AND-circuit G3 and OR-circuit B3 to reset terminal R; and line PB connected, via AND-circuit G4 and OR-circuit B2 to set terminal S of flip-flop F1. In this way, the phases of the signals from tape unit TU are "inverted" before being received by flip-flop F1. If, however, the signal on line D were low, indicating that there was no phase reversal in the record, AND-circuit G5 does not pulse flip-flop F2 which remains thus set and phase switch PS remains in its initial state.

In either case, the signal on line IRG when received at the set terminal S of flip-flop F5 causes the setting thereof with the generation of a signal at its Q output. The signal on the Q output is received by the R terminal of tape unit TU which now drives the tape in the reverse direction.

When the beginning of the tape is reached, tape unit TU generates a signal on line BOT which again resets flip-flop F5 causing the unit to again drive the tape in the forward direction and a new reading operation begins. In addition, the signal on line BOT passes through AND-gate G7 to reset flip-flop F3. The signal on the Q' output of flip-flop F3 opens AND-circuit G6 so that on this forward run of the tape, the generated-data-bit representations pass to memory MEM. In addition, the signal on the Q output of flip-flop F3 blocks AND-circuit G5.

The reading continues until an end of data signal is detected by means of an end of tape or end of message signal generated by means not shown.

There has thus, been shown means for automatically correcting for any improper phasing of the data recorded on a magnetic tape using phase-coded data representation.

While only an exemplary embodiment of the invention has been shown and described in detail, there will now be obvious to those skilled in the art, many modifications and variations satisfying many or all of the objects of the invention but which do not depart from the spirit thereof as defined by the appended claims. For example, while the apparatus automatically rereads the first block and only stores the data of this block during the rereading whether the phase is correct or not, the invention also contemplates storing the data during the first reading and proceeding with the reading of the second block if the phase is correct or clearing the stored data and rereading the first block and storing the data during the reread if the phase had been incorrect.

What is claimed is:

1. In combination with a magnetic tape unit which generates different phased signals while reading phase-coded magnetic flux patterns of blocks of data from a magnetic tape wherein the blocks are terminated by unique regions on the magnetic tape demarcated by an assumed particular direction flux transition and wherein the magnetic tape can be controllably driven in alternate directions, apparatus for insuring that the data transferred to a data utilization device correctly represents the data recorded on the magnetic tape comprising magnetic tape unit controlling means for controlling the magnetic tape unit to drive the magnetic tape in a first direction, data signal generating means for generating data signals related to the phase of the signals generated by tape unit while reading the phase-coded magnetic flux patterns, determining means for determining the logic level of a signal representing the actual direction of flux transition of the magnetic recording at the demarcation of a unique region being read, and inverting means for inverting the phase of all signals received by said data signal generating means when the logic level of the signal representing said actual direction of flux transition is different from the logic level of a signal representing the assumed particular direction of flux transition.

2. The apparatus as claimed in claim 1 wherein the different phased signals generated by the magnetic tape unit are series of pulses representing different directions of magnetic flux transition and wherein said data signal generating means is a set-reset flip-flop having a set input for receiving the series of pulses representing one direction of magnetic flux transition and a reset input for receiving the series of pulses representing another direction of magnetic flux transition.

3. The apparatus as claimed in claim 2 wherein said determining means is responsive to the output of set-reset flip-flop.

4. The apparatus as claimed in claim 2 wherein said inverting means includes a phase switching means for transmitting the series of pulses to the set and reset inputs of said set-reset flip-flop.

5. The apparatus as claimed in claim 1 further comprising means responsive to said indicating means for controlling the magnetic tape unit to drive the magnetic tape in a second and opposite direction until the beginning of the magnetic tape is sensed and then again control the magnetic tape unit to drive the magnetic tape in said one direction, and means for transferring the data signals generated while the magnetic tape is again being driven in said one direction to the data utilization device.

6. The apparatus as claimed in claim 5 wherein the different phased signals generated by the magnetic tape unit are series of pulses representing different directions of magnetic flux transition and wherein said data signal generating means is a set-reset flip-flop having a set input for receiving the series of pulses representing one direction of magnetic flux transition and a reset input for receiving the series of pulses representing another direction of magnetic flux transition.

7. The apparatus as claimed in claim 6 wherein said determining means is responsive to the output of set-reset flip-flop.

8. The apparatus as claimed in claim 6 wherein said inverting means includes a phase switching means for transmitting the series of pulses to the set and reset inputs of said set-reset flip-flop.

* * * * *